(12) United States Patent
Golden et al.

(10) Patent No.: US 9,909,436 B2
(45) Date of Patent: Mar. 6, 2018

(54) COOLING STRUCTURE FOR STATIONARY BLADE

(71) Applicant: General Electric Company

(72) Inventors: Christopher Lee Golden, Greer, SC (US); Dustin Michael Earnhardt, Greenville, SC (US); Michelle Jessica Iduate, Simpsonville, SC (US); Bryan David Lewis, Greenville, SC (US); Christopher Donald Porter, Greenville, SC (US); David Wayne Weber, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 283 days.

(21) Appl. No.: 14/801,187

(22) Filed: Jul. 16, 2015

(65) Prior Publication Data
US 2017/0016348 A1    Jan. 19, 2017

(51) Int. Cl.
*F01D 9/06*    (2006.01)
(52) U.S. Cl.
CPC .......... *F01D 9/065* (2013.01); *F05D 2240/81* (2013.01); *Y02T 50/676* (2013.01)
(58) Field of Classification Search
CPC . F01D 25/12; F01D 5/187; F01D 9/02; F01D 9/041; F01D 9/065; F01D 9/04;
(Continued)

(56) References Cited

U.S. PATENT DOCUMENTS

| 2,779,565 A | 1/1957 | Bruckmann |
| 3,885,609 A | 5/1975 | Frei et al. |

(Continued)

FOREIGN PATENT DOCUMENTS

| EP | 2407639 A1 | 1/2012 |
| EP | 2469034 A2 | 6/2012 |

OTHER PUBLICATIONS

U.S. Appl. No. 14/288,976, Office Action 1 dated Aug. 12, 2016, 28 pages.
(Continued)

*Primary Examiner* — Logan Kraft
*Assistant Examiner* — Peter T Hrubiec
(74) *Attorney, Agent, or Firm* — Ernest G. Cusick; Hoffman Warnick LLC

(57) ABSTRACT

Embodiments of the present disclosure provide a cooling structure for a stationary blade, which can include: an endwall coupled to a radial end of an airfoil, relative to a rotor axis of a turbomachine; and a substantially crescent-shaped chamber positioned within the endwall and radially displaced from a trailing edge of the airfoil, the substantially crescent-shaped chamber receiving a cooling fluid from a cooling circuit, wherein the substantially crescent-shaped chamber extends from a fore section positioned proximal to one of a pressure side surface and a suction side surface of the airfoil to an aft section positioned proximal to the trailing edge of the airfoil and the other of the pressure side surface and the suction side surface of the airfoil, wherein the aft section of the substantially crescent-shaped chamber is in fluid communication with the fore section of the substantially crescent-shaped chamber.

20 Claims, 7 Drawing Sheets

(58) Field of Classification Search
CPC ............... F01D 5/186; F05D 2220/30; F05D 2240/122; F05D 2240/128; F05D 2240/81; F05D 2250/71; F05D 2260/2214
See application file for complete search history.

(56) References Cited

U.S. PATENT DOCUMENTS

| | | | |
|---|---|---|---|
| 3,989,412 A | 11/1976 | Mukherjee | |
| 4,288,201 A | 9/1981 | Wilson | |
| 4,962,640 A | 10/1990 | Tabery | |
| 5,320,485 A | 6/1994 | Bourguignon et al. | |
| 5,344,283 A | 9/1994 | Magowan et al. | |
| 5,387,085 A | 2/1995 | Thomas, Jr. et al. | |
| 5,387,086 A | 2/1995 | Frey et al. | |
| 5,413,458 A * | 5/1995 | Calderbank | F01D 5/187 415/115 |
| 5,630,700 A | 5/1997 | Olsen et al. | |
| 5,772,398 A | 6/1998 | Noiret et al. | |
| 5,954,475 A | 9/1999 | Matsuura et al. | |
| 5,997,245 A | 12/1999 | Tomita et al. | |
| 6,036,436 A | 3/2000 | Fukuno et al. | |
| 6,065,928 A | 5/2000 | Rieck, Jr. et al. | |
| 6,126,396 A | 10/2000 | Doughty et al. | |
| 6,142,730 A | 11/2000 | Tomita et al. | |
| 6,428,270 B1 | 8/2002 | Leone et al. | |
| 6,615,574 B1 | 9/2003 | Marks | |
| 6,761,529 B2 | 7/2004 | Soechting et al. | |
| 7,204,675 B2 | 4/2007 | Texier | |
| 7,625,172 B2 | 12/2009 | Walz et al. | |
| 7,686,581 B2 | 3/2010 | Brittingham et al. | |
| 7,785,067 B2 | 8/2010 | Lee et al. | |
| 7,967,567 B2 | 6/2011 | Liang | |
| 8,011,881 B1 | 9/2011 | Liang | |
| 8,079,814 B1 | 12/2011 | Liang | |
| 8,096,767 B1 | 1/2012 | Liang | |
| 8,096,772 B2 | 1/2012 | Liang | |
| 8,100,654 B1 | 1/2012 | Liang | |
| 8,231,329 B2 | 7/2012 | Benjamin et al. | |
| 8,292,573 B2 * | 10/2012 | Broomer | F01D 9/041 415/178 |
| 8,353,669 B2 * | 1/2013 | Chon | F01D 5/187 416/193 A |
| 8,356,978 B2 | 1/2013 | Beattie et al. | |
| 8,439,643 B2 | 5/2013 | Kuhne et al. | |
| 9,021,816 B2 * | 5/2015 | Bergman | F01D 9/02 415/115 |
| 9,254,537 B2 * | 2/2016 | Li | B23P 6/045 |
| 2007/0160475 A1 | 7/2007 | Rogers et al. | |
| 2010/0129196 A1 | 5/2010 | Johnston et al. | |
| 2010/0129199 A1 | 5/2010 | Davis | |
| 2010/0239432 A1 | 9/2010 | Liang | |
| 2011/0058957 A1 | 3/2011 | Von Arx et al. | |
| 2011/0189000 A1 | 8/2011 | Vedhagiri et al. | |
| 2013/0004295 A1 | 1/2013 | Naryzhny et al. | |
| 2013/0028735 A1 | 1/2013 | Burt et al. | |
| 2014/0000285 A1 | 1/2014 | Bergman et al. | |

OTHER PUBLICATIONS

U.S. Appl. No. 14/288,976, Final Office Action 1 dated Dec. 19, 2016, 31 pages.
U.S. Appl. No. 14/288,976, Notice of Allowance dated Mar. 20, 2017, 10 pages.
U.S. Appl. No. 14/271,823, Final Office Action 1 dated Mar. 24, 2017, 16 pages.
U.S. Appl. No. 14/271,823, Office Action 1 dated Oct. 20, 2016, 21 pages.
U.S. Appl. No. 14/271,823, Non-Final Office Action dated Jun. 9, 2017, 18 pages.

* cited by examiner

COOLING STRUCTURE FOR STATIONARY BLADE

BACKGROUND OF THE INVENTION

The disclosure relates generally to stationary blades, and more particularly, to a cooling structure for a stationary blade.

Stationary blades are used in turbine applications to direct hot gas flows to moving blades to generate power. In steam and gas turbine applications, the stationary blades are referred to as nozzles, and are mounted to an exterior structure such as a casing and/or an internal seal structure by endwalls. Each endwall is joined to a corresponding end of an airfoil of the stationary blade. Stationary blades can also include passages or other features for circulating cooling fluids which absorb heat from operative components of the turbomachine.

In order to operate in extreme temperature settings, the airfoil and endwalls need to be cooled. For example, in some settings, a cooling fluid is pulled from the wheel space and directed to internal endwalls of the stationary blade for cooling. In contrast, in many gas turbine applications, later stage nozzles may be fed cooling fluid, e.g., air, extracted from a compressor thereof. Outer diameter endwalls may receive the cooling fluid directly, while inner diameter endwalls may receive the cooling fluid after it is routed through the airfoil from the outer diameter. In addition to the effectiveness of cooling, the structure of a stationary blade and its components can affect other factors such as manufacturability, ease of inspection, and the durability of a turbomachine.

BRIEF DESCRIPTION OF THE INVENTION

A first aspect of the present disclosure provides a cooling structure for a stationary blade, including: an endwall coupled to a radial end of an airfoil, relative to a rotor axis of a turbomachine, the airfoil including a pressure side surface, a suction side surface, a leading edge, and a trailing edge; and a substantially crescent-shaped chamber positioned within the endwall and radially displaced from the trailing edge of the airfoil, the substantially crescent-shaped chamber receiving a cooling fluid from a cooling circuit, wherein the substantially crescent-shaped chamber extends from a fore section positioned proximal to one of the pressure side surface and the suction side surface of the airfoil to an aft section positioned proximal to the trailing edge of the airfoil and the other of the pressure side surface and the suction side surface of the airfoil, wherein the cooling fluid in the fore section is in thermal communication with one of the pressure side surface and the suction side surface of the airfoil, the cooling fluid in the aft section is in thermal communication with a portion of the endwall proximal to the trailing edge of the airfoil, and wherein the aft section of the substantially crescent-shaped chamber is in fluid communication with the fore section of the substantially crescent-shaped chamber.

A second aspect of the present disclosure provides a stationary blade including: an airfoil including a pressure side surface, a suction side surface, a leading edge, and a trailing edge, wherein the airfoil further includes a cooling circuit therein; an endwall coupled to a radial end of an airfoil, relative to a rotor axis of a turbomachine; and a substantially crescent-shaped chamber positioned within the endwall and radially displaced from the trailing edge of the airfoil, the substantially crescent-shaped chamber receiving a cooling fluid from the cooling circuit, wherein the substantially crescent-shaped chamber extends from a fore section positioned proximal to one of the pressure side surface and the suction side surface of the airfoil to an aft section positioned proximal to the trailing edge of the airfoil and the other of the pressure side surface and the suction side surface of the airfoil, wherein the cooling fluid in the fore section is in thermal communication with one of the pressure side surface and the suction side surface of the airfoil, the cooling fluid in the aft section is in thermal communication with a portion of the endwall proximal to the trailing edge of the airfoil, and wherein the aft section of the substantially crescent-shaped chamber is in fluid communication with the fore section of the substantially crescent-shaped chamber.

A third aspect of the present disclosure provides a doublet turbine nozzle including: a first airfoil having a first cooling circuit therein; an endwall coupled to a radial end of the first airfoil, relative to a rotor axis of a turbomachine; a second airfoil having a second cooling circuit therein, the second airfoil being oriented substantially in parallel with the first airfoil, wherein the endwall is coupled to a radial end of the airfoil, relative to the rotor axis of the turbomachine, and wherein each of the first airfoil and the second airfoil further includes a pressure side surface, a suction side surface, a leading edge, and a trailing edge; a first substantially crescent-shaped chamber positioned within the endwall and radially displaced from the trailing edge of the first airfoil, the first substantially crescent-shaped chamber receiving a first cooling fluid from the first cooling circuit, wherein the first substantially crescent-shaped chamber extends from a fore section positioned proximal to one of the pressure side surface and the suction side surface of the first airfoil to an aft section positioned proximal to the trailing edge of the first airfoil and the other of the pressure side surface and the suction side surface of the first airfoil, the first cooling fluid in the fore section of the first substantially crescent-shaped chamber is in thermal communication with one of the pressure side surface and the suction side surface of the first airfoil, the first cooling fluid in the aft section of the first substantially crescent-shaped chamber is in thermal communication with a portion of the endwall proximal to the trailing edge of the first airfoil, and wherein the aft section of the first substantially crescent-shaped chamber is in fluid communication with the fore section of the first substantially crescent-shaped chamber; and a second substantially crescent-shaped chamber positioned within the endwall and radially displaced from the trailing edge of the second airfoil, the second substantially crescent-shaped chamber receiving a second cooling fluid from the second cooling circuit, wherein the second substantially crescent-shaped chamber extends from a fore section positioned proximal to one of the pressure side surface and the suction side surface of the second airfoil to an aft section positioned proximal to the trailing edge of the second airfoil and the other of the pressure side surface and the suction side surface of the second airfoil, the second cooling fluid in the fore section of the second substantially crescent-shaped chamber is in thermal communication with one of the pressure side surface and the suction side surface of the second airfoil, the second cooling fluid in the aft section of the second substantially crescent-shaped chamber is in thermal communication with a portion of the endwall proximal to the trailing edge of the second airfoil, and wherein the aft section of the second substantially crescent-shaped chamber is in fluid communication with the fore section of the second substantially crescent-shaped chamber.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

Figure 1:
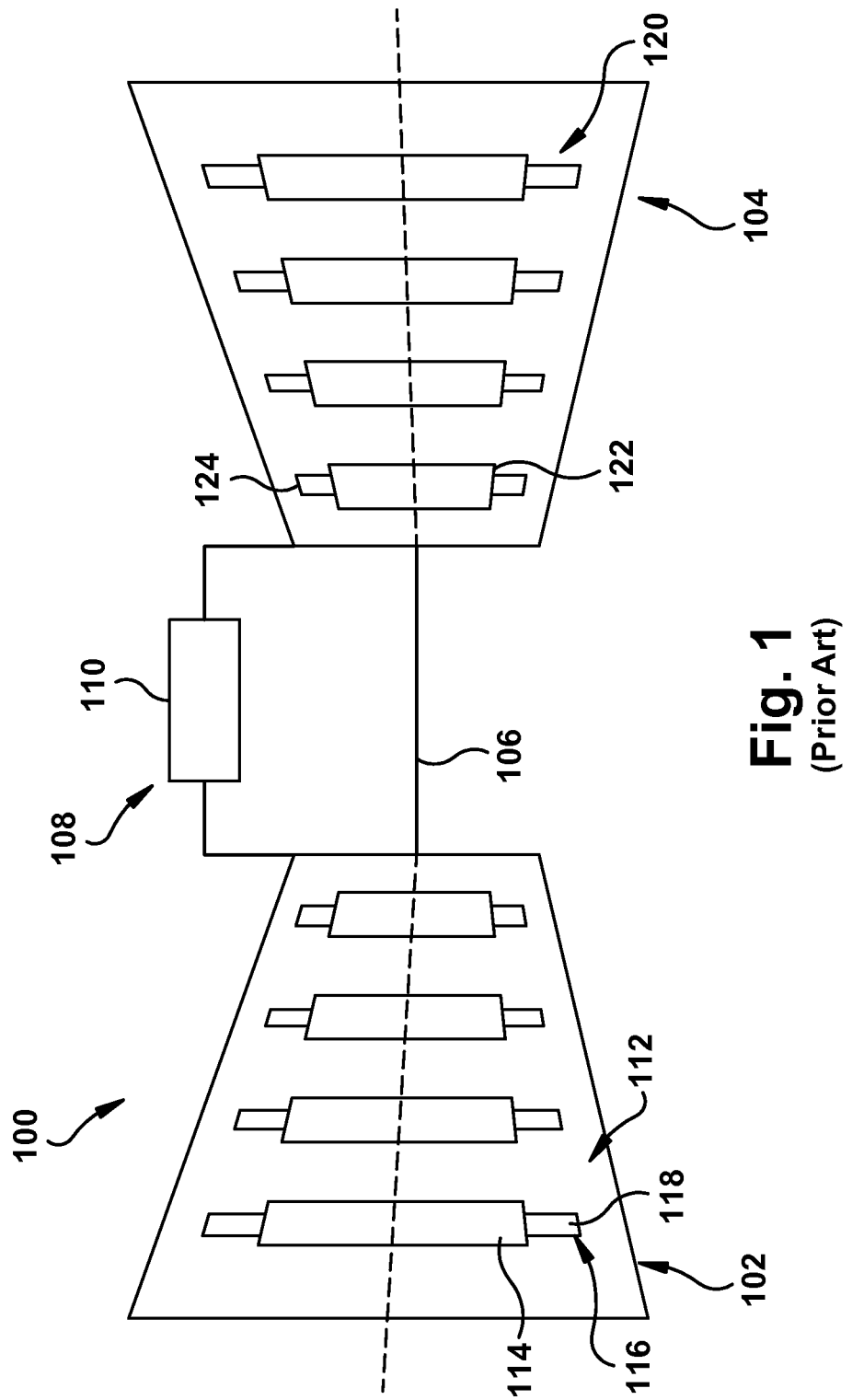
FIG. 1 shows a schematic view of a turbomachine.

It is noted that the drawings of the invention are not necessarily to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

Embodiments of the present disclosure relate generally to cooling structures for stationary blades. In particular, embodiments of the present disclosure provide an endwall coupled to a radial end of an airfoil of a stationary blade, with the airfoil including a pressure side surface, a suction side surface, a leading edge, and a trailing edge. The endwall can include a substantially crescent-shaped chamber therein, which is radially displaced from the airfoil. The substantially crescent-shaped chamber, as further described herein, can be radially displaced therefrom and positioned proximal to the pressure side surface, trailing edge, and/or suction side surface, such that the chamber partially wraps around an exterior contour of the airfoil. During operation, cooling fluids can enter the chamber and flow therethrough, to absorb heat from portions of the endwall positioned proximal to the corresponding surfaces of the airfoil (i.e., the pressure side surface, trailing edge, and/or suction side surface). The chamber can include a fore section positioned proximal to the pressure side surface or the suction side surface of the airfoil, and an aft section positioned proximal to at least the trailing edge of the airfoil and the other of the pressure side surface of suction side surface of the airfoil. The fore section and the aft section can together make up separate parts of the crescent-shaped geometry of the chamber.

Spatially relative terms, such as "inner," "outer," "underneath," "below," "lower," "above," "upper," "inlet," "outlet," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "underneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

As indicated above, the disclosure provides a cooling structure for a stationary blade of a turbomachine. In one embodiment, the cooling structure may include a substantially crescent-shaped chamber with a fore section proximal to a pressure side surface or suction side surface of an airfoil. The substantially crescent-shaped chamber can extend from the fore section to an aft section proximal to a trailing edge and the opposing pressure side surface or suction side surface of the airfoil. FIG. 1 shows a turbomachine 100 that includes a compressor portion 102 operatively coupled to a turbine portion 104 through a shared compressor/turbine shaft 106. Compressor portion 102 is also fluidically connected to turbine portion 104 through a combustor assembly 108. Combustor assembly 108 includes one or more combustors 110. Combustors 110 may be mounted to turbomachine 100 in a wide range of configurations including, but not limited to, being arranged in a can-annular array. Compressor portion 102 includes a plurality of compressor rotor wheels 112. Rotor wheels 112 include a first stage compressor rotor wheel 114 having a plurality of first stage compressor rotor blades 116 each having an associated airfoil portion 118. Similarly, turbine portion 104 includes a plurality of turbine rotor wheels 120 including a first stage turbine wheel 122 having a plurality of first stage turbine rotor blades 124. In accordance with an exemplary embodiment, a stationary blade 200 (FIG. 3) with a cooling structure according to embodiments of the present disclosure can provide cooling to endwalls and airfoils located in, e.g., turbine section 104. It will be understood, however, that embodiments of stationary blade 200 and the various cooling structures described herein may be positioned in other components or areas of turbomachine 100.

Figure 2:
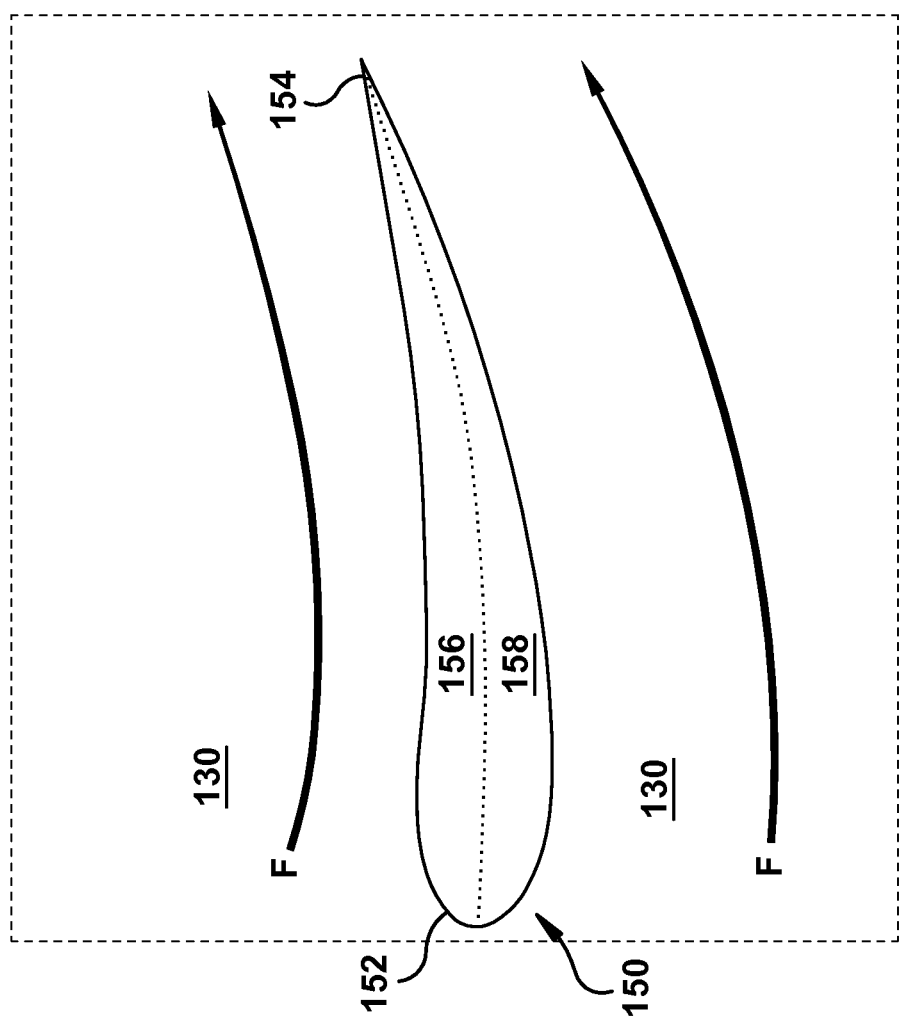
FIG. 2 is a cross-sectional view of an airfoil of a stationary blade positioned within a flow path of operative fluid according to embodiments of the present disclosure.

Turning to FIG. 2, a cross-section of flow path 130 for operating fluids which includes an airfoil 150 therein is shown. Airfoil 150 can be part of stationary blade 200 (FIG. 3), and can further include the components and/or points of reference described herein. The locations on airfoil 150 identified in FIG. 2 and discussed herein are provided as examples and not intended to limit possible locations and/or geometries for airfoils 150 according to embodiments of the present disclosure. The placement, arrangement, and orientation of various sub-components can change based on intended use and the type of power generation system in which cooling structures according to the present disclosure are used. The shape, curvatures, lengths, and/or other geometrical features of airfoil 150 can also vary based on the application of a particular turbomachine 100 (FIG. 1). Airfoil 150 can be positioned between successive turbine rotor blades 124 (FIG. 1) of a power generation system such as turbomachine 100.

Airfoil 150 can be positioned downstream of one turbine rotor blade 124 (FIG. 1) and upstream of another, subsequent turbine rotor blade 124 (FIG. 1) in a flow path for an operative fluid. Fluids can flow across airfoil 150, e.g., along path(s) F, while traveling from one turbine rotor blade 124 to another. A leading edge 152 of airfoil 150 can be positioned at an initial point of contact between operative fluid in flow path 130 and airfoil 150. A trailing edge 154, by contrast, can be positioned at the opposing side of airfoil 150. In addition, airfoil 150 can include a pressure side surface 156 and/or suction side surface 158 distinguished by a transverse line which substantially bisects leading edge 152 and extends to the apex of trailing edge 154. Pressure side surface 156 and suction side surface 158 can also be distinguished from each other based on whether fluids in flow path 130 exert positive or negative resultant pressures against airfoil 150. A portion of pressure side surface 156 positioned proximal to trailing edge 154 can be known as and referred to as a "high mach region" of airfoil 150, based on fluids flowing at a higher speed in this area relative to other surfaces of airfoil 150.

Figure 3:
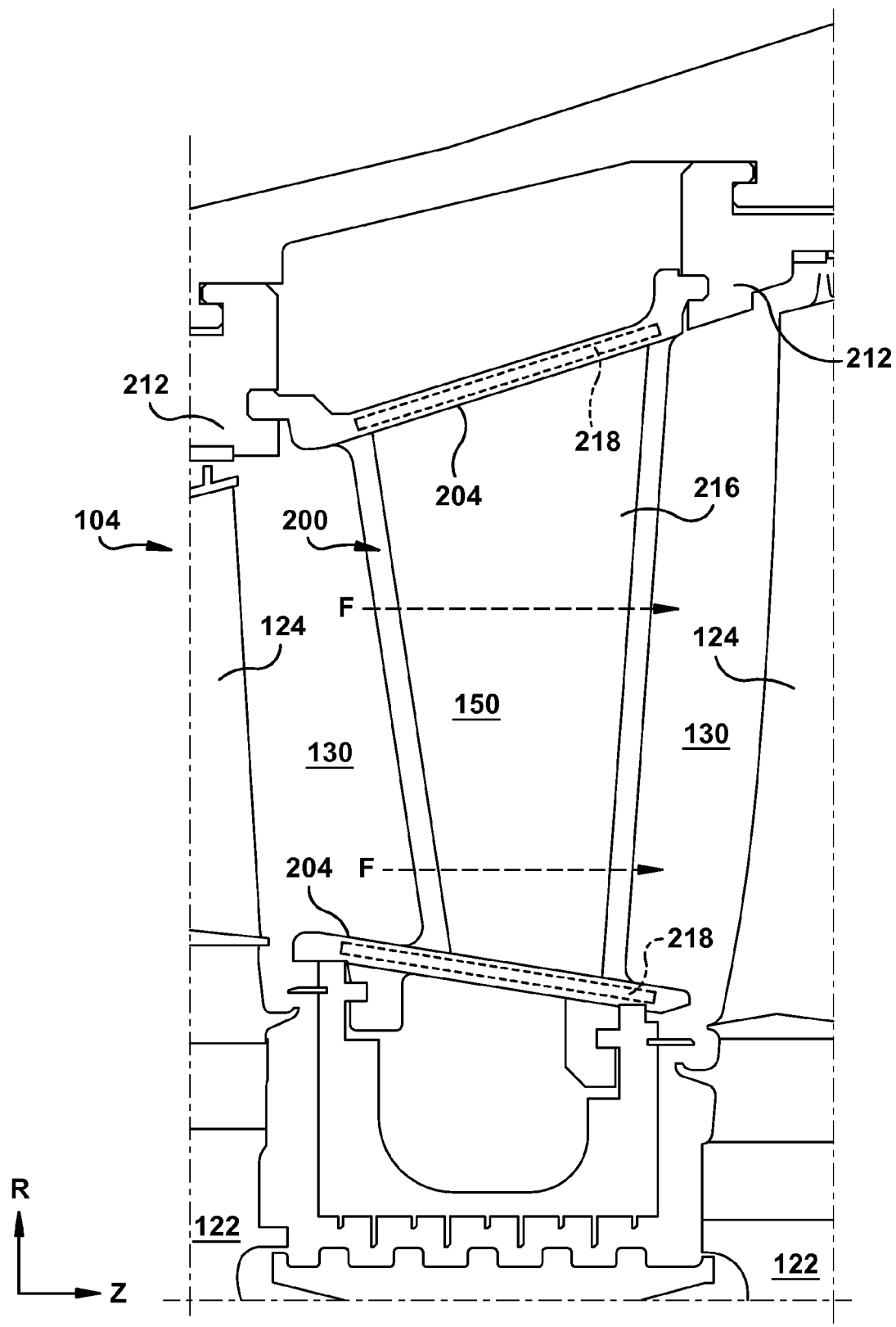
FIG. 3 is a cross-sectional view of a stationary blade between two rotor blades in a turbine section of a turbomachine.

Turning to FIG. 3, a cross section of flow path 130 past a stationary blade 200 positioned within turbine portion 104 is shown. An operative fluid (e.g., hot combustion gases, steam, etc.) can flow (e.g., along flow lines F) through flow path 130, to reach further turbine rotor blades 124 as directed by the position and contours of stationary blade 200. Turbine portion 104 is shown extending along a rotor axis Z of turbine wheel 122 (e.g., coaxial with shaft 106 (FIG. 1)), and with a radial axis R extending outwardly therefrom. Stationary blade 200 can include airfoil 150 oriented substantially along (i.e., extending in a direction approximately parallel with, i.e., within approximately ten degrees of the same angular plane) radial axis R. Although one stationary blade 200 is shown in the cross-sectional view of FIG. 3, it is understood that multiple turbine rotor blades 124 and stationary blades 200 can extend radially from turbine wheel 122, e.g., extending laterally into and/or out of the plane of the page. An airfoil 150 of stationary blade 200 can include two endwalls 204, one coupled to an inner radial end of airfoil 150 and an another coupled to an outer, opposing radial end of airfoil 150.

One endwall 204 can be positioned proximal to turbine wheel 122 located substantially at an inner radial surface, while another endwall 204 can be positioned proximal to a turbine shroud 212 located substantially at an outer radial surface. During operation, the hot combustion gases travelling along flow lines F can transfer heat to airfoil 150 and endwall(s) 204, e.g., by operative fluids contacting airfoil 150 and endwall(s) 204 of stationary blade 200. Airfoil 150 of stationary blade 200 can include a cooling circuit 216 therein. Cooling circuit 216 can include or be provided as a cavity within airfoil 150 for transmitting cooling fluids radially through airfoil 150, where the cooling fluids can absorb heat from the operative fluid in flow path 130 via the thermally conductive material composition of airfoil 150.

Cooling circuit 216, which can be in the form of an impingement cavity, can circulate a cooling fluid through a partially hollow interior of airfoil 150 between two endwalls 204. An impingement cooling circuit generally refers to a cooling circuit structured to create a film of cooling fluid about a portion of a cooled component (e.g., a transverse radial member of airfoil 150), thereby diminishing the transfer of thermal energy from substances outside the cooled component to an interior volume of the cooled component. Cooling fluids in cooling circuit 216 can originate from and/or flow to a chamber 218 positioned within one endwall 204 or both endwalls 204. Cooling fluids in chamber(s) 218 which have not traveled through cooling circuit 216 can be known as "pre-impingement" cooling fluids, while cooling fluids in chamber(s) 218 which have previously traveled through cooling circuit 216 can be known as "post-impingement" cooling fluids. Among other things, embodiments of the present disclosure can provide a cooling structure for stationary blade 200, with a chamber 218 for absorbing heat from multiple surfaces of endwall(s) 204 proximal to the location where airfoil 150 meets endwall(s) 204.

Figure 4:
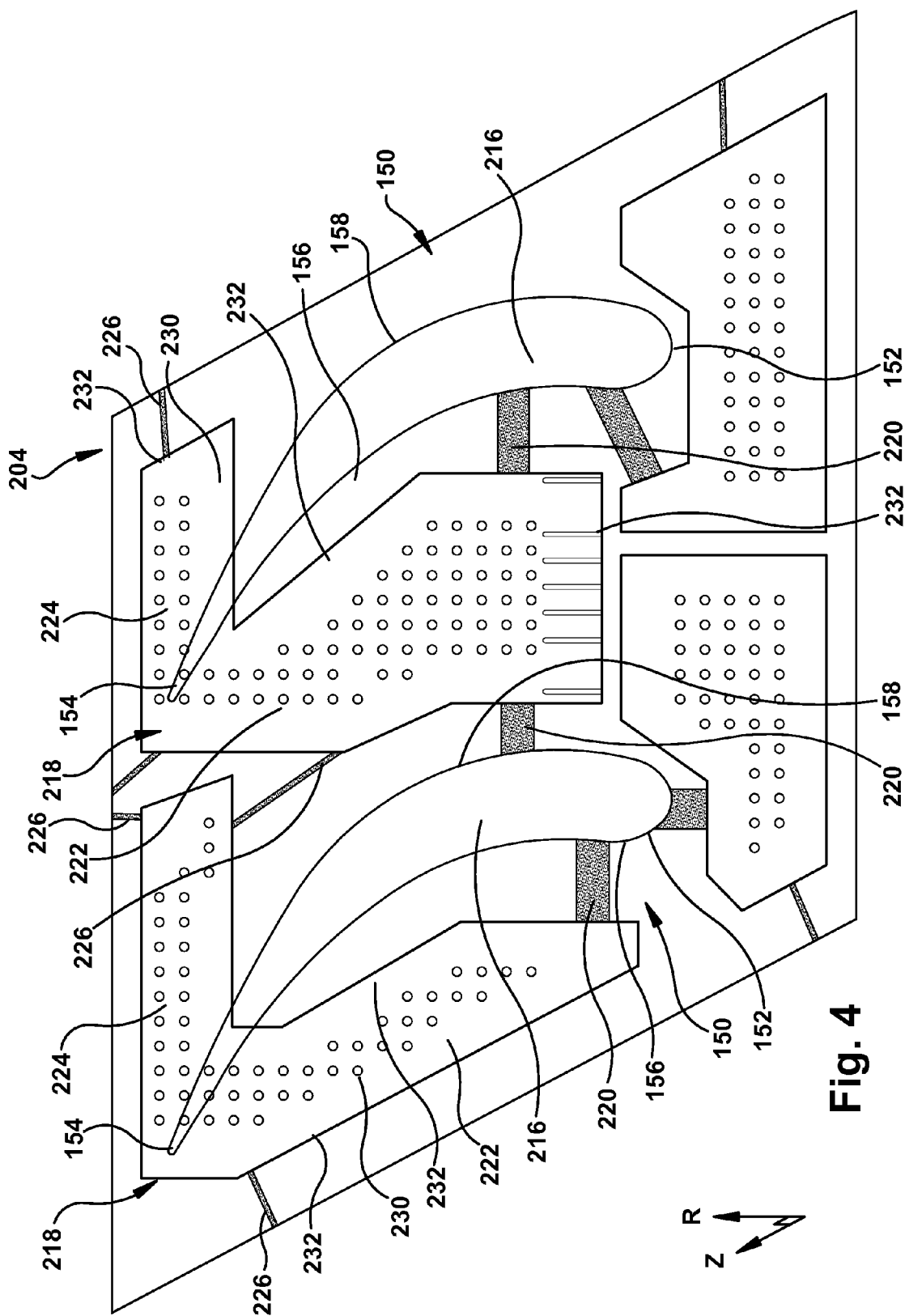
FIG. 4 is a perspective cut away view of a cooling structure for a stationary blade according to embodiments of the present disclosure.

Turning to FIG. 4, a cut-away perspective view of one endwall 204 with two chambers 218 proximal to a cross-section of two airfoils 150 is shown. Each airfoil 150 can protrude radially from endwall 204, i.e., substantially perpendicularly relative to the rotor axis of turbomachine 100 (FIG. 1). As used herein, the term "substantially perpendicular" or "substantially perpendicularly" refers to an angle of ninety degrees or an angle which differs from ninety degrees by an insubstantial amount, e.g., within a range of between approximately eighty-five degrees and approximately ninety-five degrees. Although two airfoils 150 are shown coupled to endwall 204 in FIG. 4 (i.e., in a doublet turbine nozzle configuration) as an example, it is understood that any desired number of airfoils 150 may be coupled to endwall 204 to suit varying turbomachine designs and applications. Each airfoil 150 can be one of a variety of airfoil designs and/or implementations, and as an example can be airfoils 150 of a cantilevered turbine nozzle and/or second stage nozzle of turbomachine 100. Similarly, endwall 204 can include two chambers 218, each of which can correspond to one airfoil 150 in a doublet configuration, or any desired number of chambers 218 therein to suit varying applications.

One or more inlets 220 can provide fluid communication between each chamber 218 and a source of cooling fluids, e.g., cooling circuit(s) 216. Each chamber 218 can be substantially crescent-shaped. As used herein, the term "substantially crescent-shaped" can include any geometry which includes two branching, independent paths originating from the same point of convergence and extending in at least one shared direction. As examples, a crescent-shape according to this definition can include a C-shape, a V-shape, J-shape, an arc, a boomerang-type shape, a crook shape, etc. Regardless of the type of substantial crescent shape, one end of chamber 218 can be positioned proximal to pressure side surface 156 or suction side surface 158 of airfoil 150, and an opposing end of chamber 218 can be positioned proximal to the opposing pressure or suction side surface 156, 158 of airfoil 150. Chamber 218 can thus extend around or underneath trailing edge 154 of airfoil 150. In addition, two sections of chamber 218 can converge radially beneath trailing edge 154 of airfoil 150. The substantially crescent-shaped geometry of chamber 218 can thus provide a wrap-around geometry which can substantially follow the contours of airfoil 150 along portions of pressure side surface 156 and/or suction side surface 158, but passes radially beneath trailing edge 154.

Each chamber 218 can include a fore section 222 and an aft section 224 therein. Fore section 222 can be positioned proximal to pressure side surface 156 or suction side surface 158, i.e., separated therefrom only by the material composition of endwall 204. Fore section 222 is shown as being proximal to pressure side surface 156 in FIG. 4 as an example, but in alternative embodiments can be proximal to suction side surface 158. In addition, as shown in FIG. 4, fore section 222 of chamber 218 can be positioned proximal to pressure side surface 156 of a corresponding airfoil 150 while also being proximal to a suction side surface 158 of a different airfoil 150. Aft section 224 can be positioned proximal to both trailing edge 154 and the opposing pressure side surface 156 or suction side surface 158, relative to fore section 222. Fore section 222 and aft section 224 may be distinguishable from each other solely based on their position relative to surfaces of airfoil 150, but it is understood that additional structural features, such as an additional section or structure positioned between fore section 222 and aft section 224 discussed elsewhere herein, can further distinguish fore section 222 of chamber 218 from aft section 224 of chamber 218.

During operation of turbomachine 100 (FIG. 1), cooling fluids can enter chamber 218 through inlet(s) 220 to pass sequentially through fore section 222 and aft section 224 before exiting chamber 218 through outlet(s) 226. Each chamber 218 can include inlets from, e.g., one cooling circuit 216 or multiple cooling circuits 216 of respective airfoils 150. Cooling fluids in fore section 222 of chamber 218 can absorb heat from a portion of endwall 204 positioned proximal to the pressure side surface 156 or suction side surface 158 of airfoil 150 while passing therethrough, e.g., via heat transfer from airfoil 150 to chamber 218 through endwall 204. Cooling fluids in aft section 224 of chamber 218 can absorb heat from a portion of endwall 204 positioned proximal to the pressure side surface 156 or suction side surface 158, (opposing the surface proximal to fore section 222) and trailing edge 154 of airfoil 150 while passing therethrough. Fore section 222 and aft section 224 of chamber 218 can converge with each other radially beneath trailing edge 154 of airfoil 150. In other embodiments, as discussed in further detail herein, fore section 222 and aft section 224 can converge at a transition section 236 (FIG. 6) which spans, e.g., the same axial length as trailing edge 154 of airfoil 150. Aft section 224 and fore section 222 can extend from each other and/or transition section 236 substantially perpendicularly relative to each other, and within the same radial plane of endwall 204.

Fore section 222 and aft section 224 of chamber 218 can be shaped to have different dimensions and/or contours. In an embodiment, fore section 222 can have an axial length (e.g., along axis Z) which is at least approximately one-half of the axial length of airfoil 150 along the proximal pressure side surface 156 or suction side surface 158. By contrast, aft section 224 may extend across less than half of an axial length of the opposing pressure side surface 156 or suction side surface 158 of airfoil 150. The axial length of aft section 224 being less than an axial length of fore section 222 can cause fore section 222 to be significantly larger than aft section 224, such that the substantially crescent-shaped chamber 218 exhibits a J-type shape.

Figure 5:
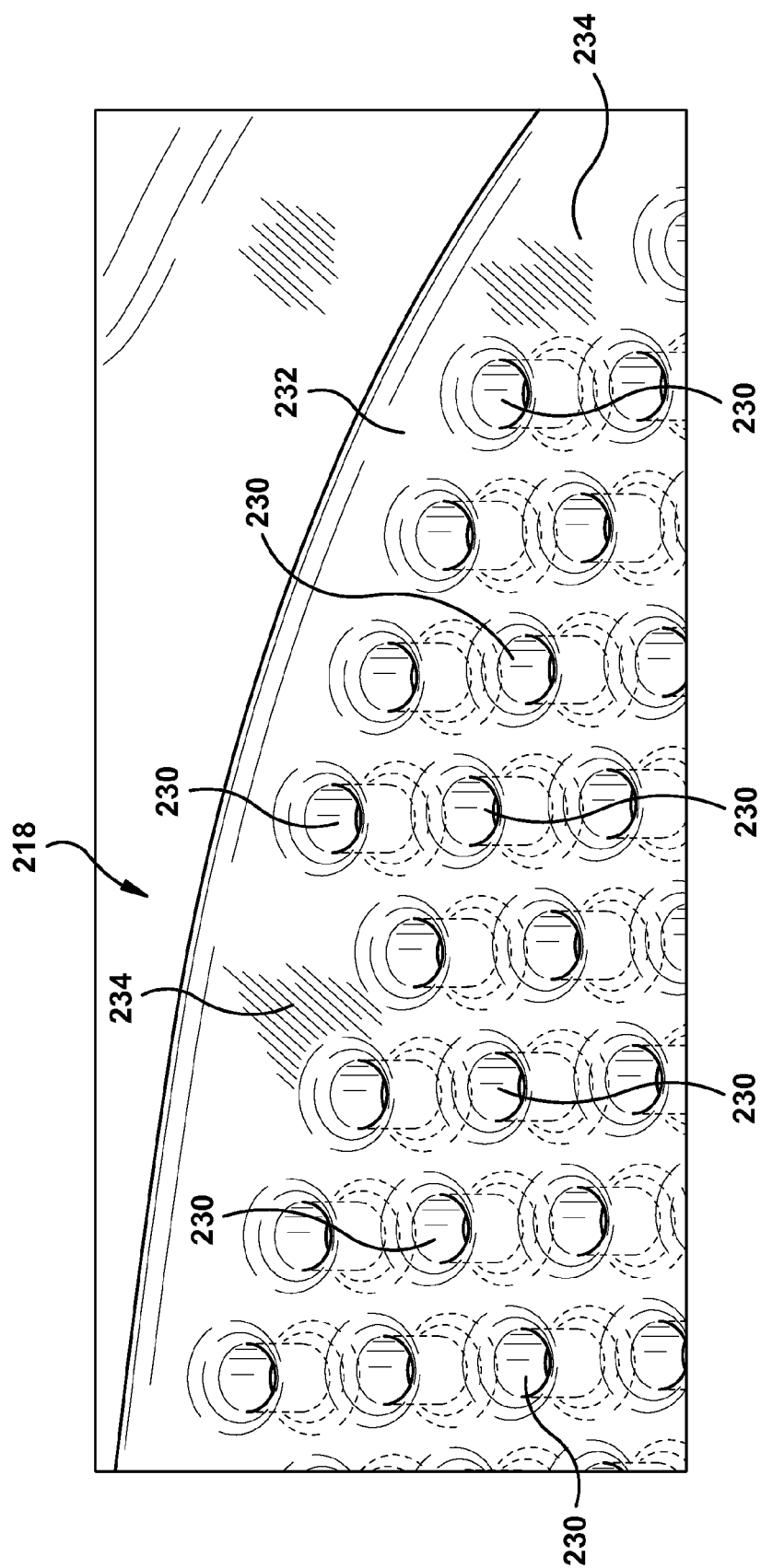
FIG. 5 is a perspective partial cut away view of a chamber within an endwall according to embodiments of the present disclosure.

Referring to FIGS. 4 and 5 together, embodiments of the present disclosure can include any number of thermally conductive fixtures ("fixtures") 230, such as a pedestal, within chamber(s) 218 (e.g., within fore section 222 or aft section 224) for transferring heat from stationary blade 200 to cooling fluids within chamber(s) 218. More specifically, each fixture 230 can transmit heat from endwall 204 to cooling fluids therein by increasing the contact area between cooling fluids passing through chamber(s) 218 and the material composition of endwall 204. Fixtures 230 can be provided as any conceivable fixture for increasing the contact area between cooling fluids and thermally conductive surfaces, and as examples can be in the form of pedestals, dimples, protrusions, pins, walls, and/or other fixtures of other shapes and sizes. Furthermore, fixtures 230 can take a variety of shapes, including those with cylindrical geometries, substantially pyramidal geometries, irregular geometries with four or more surfaces, etc. In any event, one or more fixtures 230 can be positioned within chamber 218 in a location of the cooling fluid flow path located downstream of inlet(s) 220, and upstream of outlet(s) 226.

The positioning of fixtures 230, in addition to improving heat transfer between endwall 204 and cooling fluids therein, can increase the temperature difference between cooling fluids within fore section 222 and aft section 224. The spacing between adjacent fixtures 230 can be sized to accommodate inspection and testing by particular instruments. Inspection of stationary blade 200 can include, e.g., contacting a pre-cast component of stationary blade 200 and/or a partially constructed stationary blade 200 or endwall 204 with a borescope lens or other machine for testing the properties of a material. For example, adjacent fixtures 230 can have a sufficient separation distance for a borescope lens or other piece of inspection equipment to be placed within chamber(s) 218 between several pedestals 230. The spacing between pedestals can vary between applications, and as an example can be between, e.g., approximately one millimeter (mm) and approximately twenty mm to accommodate a range of borescope diameters. In some embodiments, pedestals 230 may be partially or completely absent from chamber 218. Chamber 218 can also be bounded by a perimeter wall 232 extending across a predetermined radial length of endwall 204, thereby defining a height dimension of chamber 218. In embodiments where chamber 218 includes pedestals 230 therein, chamber 218 can also include a plurality of access zones 234 positioned substantially along portions of perimeter wall 232. Each access zone 234 can be free of pedestals 230 therein, providing additional space for conducting inspections of chamber 218 with a borescope and/or other tools.

Figure 6:
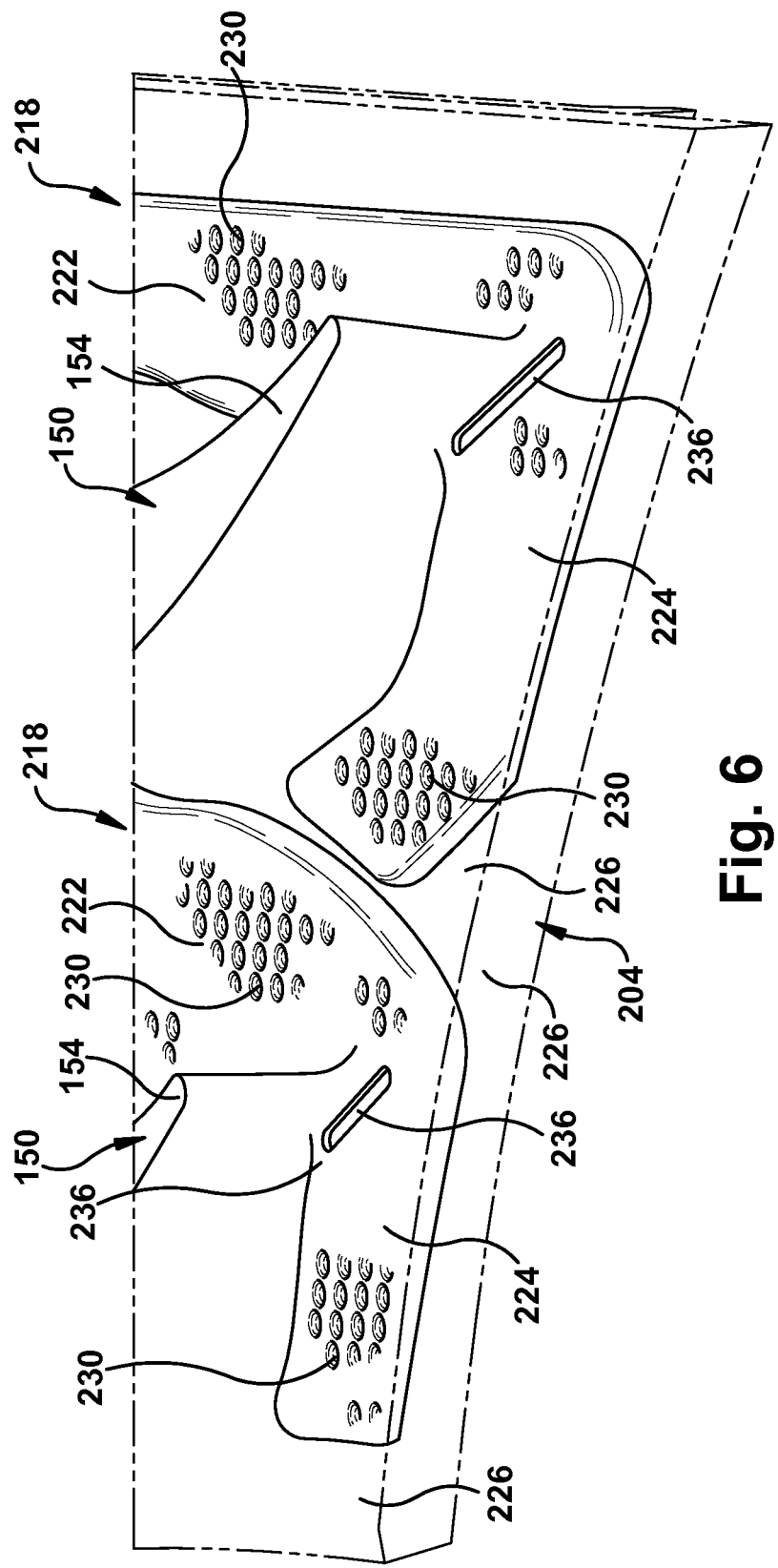
FIG. 6 provides a perspective partial cut away view of a transition section of a chamber according to embodiments of the present disclosure.

Turning to FIG. 6, a partial perspective cut away view of endwall 204 with chambers 218 therein is shown. One or more chambers 218 of endwall 204 can further include a transition section 236 positioned between fore section 222 and aft section 224 of chamber 218. To increase the rate of heat transfer from airfoil 150 to cooling fluids in chamber 218, transition section 236 can be substantially radially aligned with trailing edge 154 of airfoil 150. Furthermore, to increase the flow rate of cooling fluids through transition section 236, transition section 236 can optionally include fixtures 230 therein. In an alternative embodiment, transition section 236 can be free of fixtures 230 therein. To divert a portion of cooling fluid which has not absorbed heat in aft section 224, one or more outlets 226 may be at least partially in fluid communication with transition section 236. To further provide heat transfer from trailing edge 154 of airfoil 150, an axial width of transition section 236 between fore section 222 and aft section 224 can be approximately equal to an axial width of trailing edge 154, such that substantially no fixtures 230 are positioned radially beneath trailing edge 154.

Figure 7:
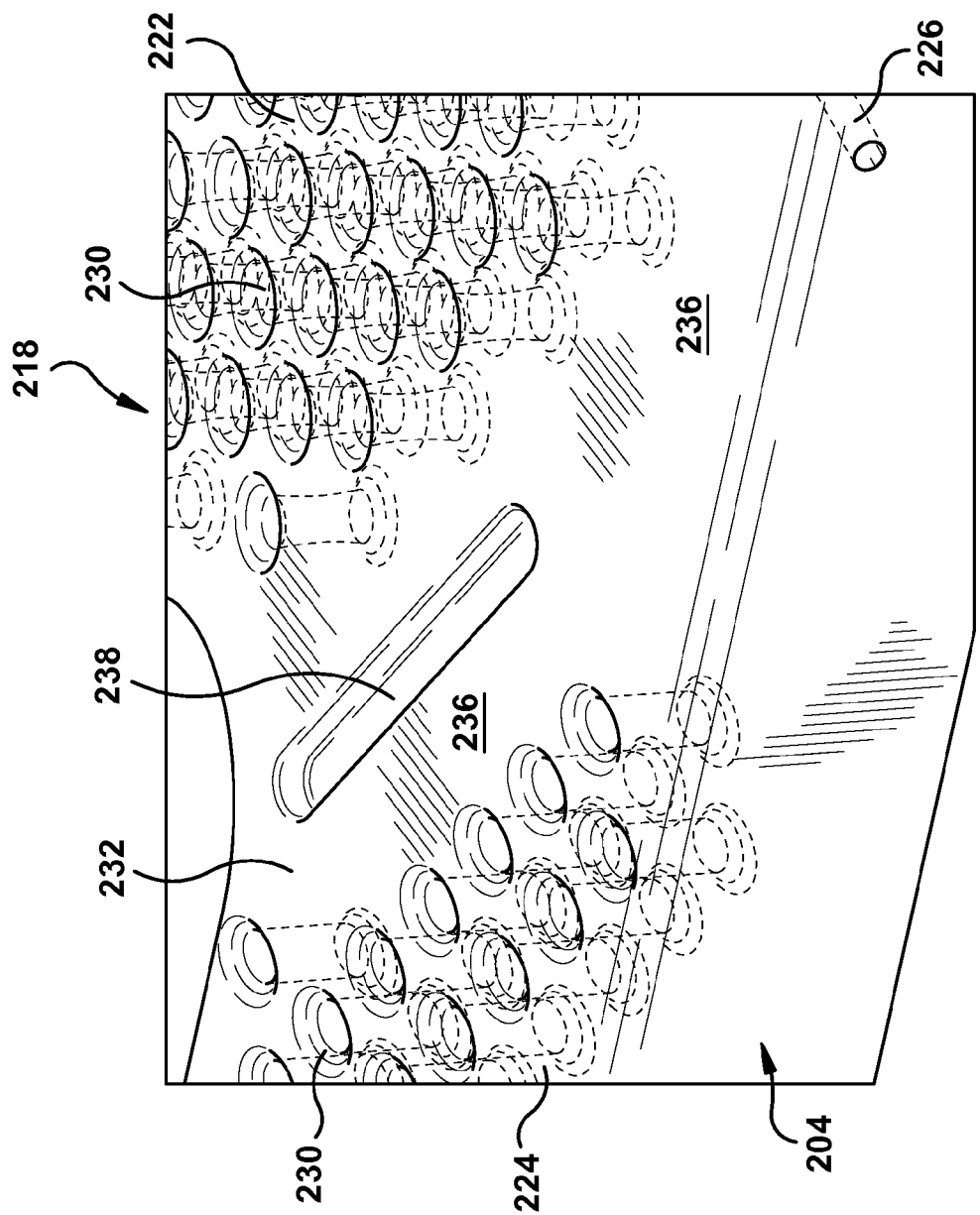
FIG. 7 is an enlarged perspective partial cut away view of a transition section of a chamber according to embodiments of the present disclosure.

Turning to FIG. 7, a partial perspective view of transition section 236 is shown in further detail. Transition section 236 can optionally include a protrusion 238 therein, e.g., extending from an upper or lower radial surface of chamber 218, to direct cooling fluids in fore section 222 into aft section 224 of chamber 218. Protrusion 238 can be in the form of an elongated fixture, as shown by example in FIG. 7, and can be composed of the same thermally conductive material as endwall 204 or a different thermally conductive material. As is also shown in FIG. 7, protrusion 238 can be of a different shape from fixture(s) 230, such as an elongated baffle, swirler, nozzle, etc., for directing at least a portion of cooling fluids into aft section 224 of chamber 218. In operation, protrusion 238 can be thermally conductive or thermally insulative, based on whether further heat absorption in transition section 236 is desired. Protrusion 238 during operation can also direct portions of cooling air within chamber 218 into aft section 224, and/or into other components via outlets 226.

Embodiments of the present disclosure can provide several technical and commercial advantages, some of which are discussed by example herein. For example, providing a substantially crescent-shaped chamber within endwall(s) 204 can improve thermal communication between different surfaces of airfoil 150 and cooling fluids within endwall 204. Among other things, improved thermal communication can reduce the total amount of nozzle cooling flow needed during operation, and can reduce the design complexity needed to form endwalls 204 out of cast, ferrous metal substances such as aluminum, copper, iron, lead, and/or combinations of these materials. The substantially crescent shape of chamber 218, with a point of convergence radially displaced from trailing edge 154 of airfoil 150, can reduce the mechanical stiffness of chamber 218. This reduction in mechanical stiffness can provide derivative mechanical benefits, such as improved manufacturability and/or durability.

The apparatus and method of the present disclosure is not limited to any one particular gas turbine, combustion engine, power generation system or other system, and may be used with other power generation systems and/or systems (e.g., combined cycle, simple cycle, nuclear reactor, etc.). Additionally, the apparatus of the present invention may be used with other systems not described herein that may benefit from the increased operational range, efficiency, durability and reliability of the apparatus described herein. In addition, the various injection systems can be used together, on a single nozzle, or on/with different nozzles in different portions of a single power generation system. Any number of different embodiments can be added or used together where desired, and the embodiments described herein by way of example are not intended to be mutually exclusive of one another.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

This written description uses examples to disclose the invention, including the best mode, and to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A cooling structure for a stationary blade, comprising:
an endwall coupled to a radial end of an airfoil, relative to a rotor axis of a turbomachine, the airfoil including a pressure side surface, a suction side surface, a leading edge, and a trailing edge;
a substantially crescent-shaped chamber positioned within the endwall, the substantially crescent-shaped chamber receiving a cooling fluid from a cooling circuit, wherein the substantially crescent-shaped chamber includes:
a fore section positioned proximal to one of the pressure side surface and the suction side surface of the airfoil,
a transition section positioned directly radially beneath the trailing edge of the airfoil and in thermal communication with the trailing edge of the airfoil through the endwall, and
an aft section positioned proximal to the trailing edge of the airfoil and the other of the pressure side surface and the suction side surface of the airfoil, such that the aft section is oriented substantially perpendicularly with respect to the fore section and substantially in parallel with a perimeter surface of the endwall;
an inlet positioned within the endwall, fluidly connecting an impingement cavity of the airfoil to the fore section of the substantially crescent-shaped chamber; and
an outlet positioned within the endwall, fluidly connecting the aft section of the substantially crescent-shaped chamber to a fluid cavity positioned outside the airfoil and the substantially crescent-shaped chamber;
wherein the cooling fluid in the fore section is in thermal communication with a portion of the endwall proximal to one of the pressure side surface and the suction side surface of the airfoil, the cooling fluid in the aft section is in thermal communication with a portion of the endwall proximal to the trailing edge of the airfoil, and wherein the aft section of the substantially crescent-shaped chamber is in fluid communication with the fore section of the substantially crescent-shaped chamber, such that the cooling fluid within the aft section is transmitted from the transition section of the substantially crescent-shaped chamber.

2. The cooling structure of claim 1, wherein the aft section of the substantially crescent-shaped chamber only receives the cooling fluid from the transition section of the substantially crescent-shaped chamber.

3. The cooling structure of claim 1, further comprising a plurality of thermally conductive fixtures extending through at least one of the fore section and the aft section of the substantially crescent-shaped chamber.

4. The cooling structure of claim 3, wherein the substantially crescent-shaped chamber further includes a perimeter wall, and further comprising a plurality of access zones positioned substantially along the perimeter wall of the substantially crescent-shaped chamber, each of the plurality of access zones being free of thermally conductive fixtures therein.

5. The cooling structure of claim 3, wherein the transition section is free of thermally conductive fixtures therein.

6. The cooling structure of claim 1, wherein an axial length component of the fore section of the substantially crescent-shaped chamber is at least one-half of an axial length component of one of the pressure side surface and the suction side surface of the airfoil.

7. The cooling structure of claim 1, wherein the transition section includes a protrusion extending from a radial surface of the transition section, the protrusion being configured to direct the cooling fluid from the fore section into the aft section of the substantially crescent-shaped chamber.

8. The cooling structure of claim 7, wherein a width of the transition section between the fore section and the aft section is equal to an axial width of the trailing edge of the airfoil.

9. The cooling structure of claim 1, wherein the substantially crescent-shaped chamber comprises one of at least two substantially crescent-shaped chambers positioned within the endwall, and wherein the airfoil comprises one of a pair of airfoils protruding substantially radially from the endwall.

10. A stationary blade comprising:
an airfoil including a pressure side surface, a suction side surface, a leading edge, and a trailing edge, wherein the airfoil further includes a cooling circuit therein;
an endwall coupled to a radial end of an airfoil, relative to a rotor axis of a turbomachine;
a substantially crescent-shaped chamber positioned within the endwall, the substantially crescent-shaped chamber receiving a cooling fluid from the cooling circuit, wherein the substantially crescent-shaped chamber includes:
a fore section positioned proximal to one of the pressure side surface and the suction side surface of the airfoil,
a transition section positioned directly radially beneath the trailing edge of the airfoil and in thermal communication with the trailing edge of the airfoil through the endwall, and
an aft section positioned proximal to the trailing edge of the airfoil and the other of the pressure side surface and the suction side surface of the airfoil, such that the aft section is oriented substantially perpendicularly with respect to the fore section and substantially in parallel with a perimeter surface of the endwall;
an inlet positioned within the endwall, fluidly connecting an impingement cavity of the airfoil to the fore section of the substantially crescent-shaped chamber; and
an outlet positioned within the endwall, fluidly connecting the aft section of the substantially crescent-shaped chamber to a fluid cavity positioned outside the airfoil and the substantially crescent-shaped chamber;
wherein the cooling fluid in the fore section is in thermal communication with a portion of the endwall proximal to one of the pressure side surface and the suction side surface of the airfoil, the cooling fluid in the aft section is in thermal communication with a portion of the endwall proximal to the trailing edge of the airfoil, and wherein the aft section of the substantially crescent-shaped chamber is in fluid communication with the fore section of the substantially crescent-shaped chamber, such that the cooling fluid within the aft section is transmitted from the transition section of the substantially crescent-shaped chamber.

11. The stationary blade of claim 10, wherein the aft section of the substantially crescent-shaped chamber only receives the cooling fluid from the transition section of the substantially crescent-shaped chamber.

12. The stationary blade of claim 10, further comprising a plurality of thermally conductive fixtures extending through at least one of the fore section and the aft section of the substantially crescent-shaped chamber.

13. The stationary blade of claim 12, wherein the transition section is free of thermally conductive fixtures therein.

14. The stationary blade of claim 13, wherein a width of the transition section between the fore section and the aft section is equal to an axial width of the trailing edge of the airfoil.

15. The stationary blade of claim 12, wherein the substantially crescent-shaped chamber further includes a perimeter wall, and further comprising a plurality of access zones positioned substantially along the perimeter wall of the substantially crescent-shaped chamber, each of the plurality of access zones being free of thermally conductive fixtures therein.

16. The stationary blade of claim 10, wherein the transition section includes a protrusion extending from a radial surface of the transition section, the protrusion being configured to direct the cooling fluid from the fore section into the aft section of the substantially crescent-shaped chamber.

17. A doublet turbine nozzle comprising:
a first airfoil having a first cooling circuit therein;
an endwall coupled to a radial end of the first airfoil, relative to a rotor axis of a turbomachine;
a second airfoil having a second cooling circuit therein, the second airfoil being oriented substantially in parallel with the first airfoil, wherein the endwall is coupled to a radial end of the airfoil, relative to the rotor axis of the turbomachine, and wherein each of the first airfoil and the second airfoil further includes a pressure side surface, a suction side surface, a leading edge, and a trailing edge;
a first substantially crescent-shaped chamber positioned within the endwall, the first substantially crescent-shaped chamber receiving a first cooling fluid from the first cooling circuit,
wherein the first substantially crescent-shaped chamber includes:
a fore section positioned proximal to the suction side surface of the first airfoil,
a transition section positioned directly radially beneath the trailing edge of the first airfoil and in thermal communication with the trailing edge of the first airfoil through the endwall, and
an aft section positioned proximal to the trailing edge of the first airfoil and the other of the pressure side surface and the suction side surface of the first airfoil, such that the aft section is oriented substantially perpendicularly with respect to the fore section and substantially in parallel with a perimeter surface of the endwall;
a first inlet positioned within the endwall, fluidly connecting an impingement cavity of the first airfoil to the fore section of the first substantially crescent-shaped chamber;
a first outlet positioned within the endwall, fluidly connecting the aft section of the first substantially crescent-shaped chamber to a fluid cavity positioned outside the first airfoil and the first substantially crescent-shaped chamber;
wherein the first cooling fluid in the fore section of the first substantially crescent-shaped chamber is in thermal communication with a portion of the endwall proximal to one of the pressure side surface and the suction side surface of the first airfoil, the first cooling fluid in the aft section of the first substantially crescent-shaped chamber is in thermal communication with a portion of the endwall proximal to the trailing edge of the first airfoil, and wherein the aft section of the first substantially crescent-shaped chamber is in fluid communication with the fore section of the first substantially crescent-shaped chamber, such that the cooling fluid within the aft section is transmitted from the transition section of the first substantially crescent-shaped chamber;
a second substantially crescent-shaped chamber positioned within the endwall, the second substantially crescent-shaped chamber receiving a second cooling fluid from the second cooling circuit, wherein the second substantially crescent-shaped chamber includes:
- a fore section positioned proximal to the suction side surface of the second airfoil,
- a transition section positioned directly radially beneath the trailing edge of the second airfoil and in thermal communication with the trailing edge of the second airfoil through the endwall, and
- an aft section positioned proximal to the trailing edge of the second airfoil and the other of the pressure side surface and the suction side surface of the second airfoil, such that the aft section is oriented substantially perpendicularly with respect to the fore section and substantially in parallel with the perimeter surface of the endwall;

a second inlet positioned within the endwall, fluidly connecting an impingement cavity of the second airfoil to the fore section of the second substantially crescent-shaped chamber; and a second outlet positioned within the endwall, fluidly connecting the aft section of the second substantially crescent-shaped chamber to a fluid cavity positioned outside the second airfoil and the second substantially crescent-shaped chamber;

wherein the second cooling fluid in the fore section of the second substantially crescent-shaped chamber is in thermal communication with a portion of the endwall proximal to one of the pressure side surface and the suction side surface of the second airfoil, the second cooling fluid in the aft section of the second substantially crescent-shaped chamber is in thermal communication with a portion of the endwall proximal to the trailing edge of the second airfoil, and wherein the aft section of the second substantially crescent-shaped chamber is in fluid communication with the fore section of the second substantially crescent-shaped chamber, such that the cooling fluid within the aft section is transmitted from the transition section of the second substantially crescent-shaped chamber.

18. The doublet turbine nozzle of claim 17, further comprising a plurality of thermally conductive fixtures extending through one of the first and second substantially crescent-shaped chambers in one of the fore section and the aft section thereof.

19. The doublet turbine nozzle of claim 17, wherein the aft section of the first substantially crescent-shaped chamber only receives the cooling fluid from the transition section of the first substantially crescent-shaped chamber, and wherein the aft section of the second substantially crescent-shaped chamber only receives the cooling fluid from the transition section of the second substantially crescent-shaped chamber.

20. The doublet turbine nozzle of claim 18, wherein the transition section of each substantially crescent-shaped chamber further includes a protrusion extending from an axial surface of the transition section, the protrusion being configured to direct the cooling fluid from the fore section into the aft section of the substantially crescent-shaped chamber.

* * * * *